US008334045B2

(12) United States Patent
Schaety et al.

(10) Patent No.: US 8,334,045 B2

(45) Date of Patent: Dec. 18, 2012

(54) WRAPPING TAPE FOR A CABLE HARNESS

(75) Inventors: Harald Schaety, Wetzlar (DE); Mario Stigler, Schoeffengrund (DE); Hans-Peter Seng, Reiskirchen (DE); Wolfgang Gerlach, Biebertal (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 12/914,526

(22) Filed: Oct. 28, 2010

(65) Prior Publication Data

US 2011/0070405 A1 Mar. 24, 2011

Related U.S. Application Data

(63) Continuation of application No. PCT/US2009/041968, filed on Apr. 28, 2009.

(30) Foreign Application Priority Data

Apr. 29, 2008 (DE) ......................... 10 2008 022 336

(51) Int. Cl.

*B32B 3/00* (2006.01)
*B32B 3/30* (2006.01)
*B32B 3/28* (2006.01)

(52) U.S. Cl. ........... 428/167; 428/156; 428/192; 428/60

(58) Field of Classification Search .................. 428/156, 428/167, 192, 60, 170; 473/301; 248/68.1, 248/49

See application file for complete search history.

(56) References Cited

U.S. PATENT DOCUMENTS

| | | | |
|---|---|---|---|
| 2,807,997 | A | 10/1957 | Wognum et al. |
| 3,331,312 | A | 7/1967 | Leslie et al. |
| 3,943,608 | A | 3/1976 | Farkas |
| 4,265,687 | A | 5/1981 | Mercer |
| 4,368,762 | A | 1/1983 | Peterpaul |
| 4,371,010 | A | 2/1983 | Hidassy |
| 4,502,905 | A | 3/1985 | Jung et al. |
| 4,534,817 | A | 8/1985 | O'Sullivan |
| 4,899,963 | A | 2/1990 | Murphy |
| 5,062,920 | A | 11/1991 | Horikx et al. |
| 5,282,347 | A | 2/1994 | Cleine et al. |
| 5,509,994 | A | 4/1996 | Recchia et al. |
| 5,573,627 | A | 11/1996 | Vuong |
| 6,136,118 | A | 10/2000 | Bartholomew et al. |
| 6,494,412 | B2 | 12/2002 | Gombert |
| 6,827,316 | B1 | 12/2004 | Arai |
| 7,055,783 | B2 | 6/2006 | Rosemann et al. |
| 7,207,529 | B2 | 4/2007 | Rosemann et al. |

(Continued)

FOREIGN PATENT DOCUMENTS

DE 3413099 C 5/1994

(Continued)

*Primary Examiner* — Catherine A Simone

(74) *Attorney, Agent, or Firm* — Michael P. Leary

(57) ABSTRACT

A wrapping tape for automatically circumferentially wrapping an axially extending article, in particular a cable or a cable loom, the tape suitable for wrapping around the article and then tautened and joined to itself in an overlapping manner by a joining tool. The wrapping tape comprises a core with a contact area, which is designed to rest on the article; and tabs protruding laterally from the core. A tab forms such an angle with the contact area that the joining tool can engage behind the tab when the tape is wrapped tightly around the article, and without the tool engaging behind the contact area, while tabs of overlapping tape portions are joined to one another.

16 Claims, 10 Drawing Sheets

U.S. PATENT DOCUMENTS

| | | | | |
|---|---|---|---|---|
| 7,322,548 | B2 | 1/2008 | Miehlke | |
| 7,854,414 | B2 | 12/2010 | Head et al. | |
| 8,028,962 | B2 | 10/2011 | Geiger | |
| 2002/0098904 | A1 * | 7/2002 | Huang | 473/300 |
| 2004/0144899 | A1 | 7/2004 | Rosemann et al. | |
| 2005/0000627 | A1 | 1/2005 | Weinberg | |
| 2005/0233114 | A1 * | 10/2005 | Chi | 428/156 |
| 2007/0071976 | A1 | 3/2007 | Wahlers-Schmidlin et al. | |
| 2007/0181244 | A1 | 8/2007 | Billing et al. | |

FOREIGN PATENT DOCUMENTS

| | | | |
|---|---|---|---|
| DE | 29510148 | U | 9/1995 |
| DE | 10349046 | A | 6/2005 |

* cited by examiner

WRAPPING TAPE FOR A CABLE HARNESS

CROSS-REFERENCE TO RELATED APPLICATIONS

This application is a continuation of PCT Application No. PCT/US2009/041968, filed Apr. 28, 2009 which claims the benefit of German Patent Application No. 102008022336.0, filed Apr. 29, 2008.

BACKGROUND OF THE INVENTION

The present invention relates to an apparatus and a method for automatically, circumferentially wrapping articles which extend in the axial direction, in particular cables or cable looms, as used, for example, in the automotive industry as a cable harness. The invention particularly relates to a wrapping tape and a fastening element, which are used for automatic, circumferential wrapping purposes.

Cable harnesses are frequently used in automobile construction. A cable harness is a loom of cables which transmit signals or information or operating currents (energy). The cables are combined, for example, by clips, cable binders or tubes. Modern motor vehicles may have electrical wires which, in total, can reach a distance of several kilometers.

The cables of the loom are combined to form a cable harness and are interlocked, that is to say assembled, on a special workbench (wrapping area) or on a nail board (modeling board). A harness of this type has only a limited degree of flexibility and can then be installed. Cable harnesses are generally assembled in accordance with geometric and electrical requirements. In spite of advances in automation, cable harnesses continue to be largely manually produced in the vehicle industry. One of the reasons for this is the many different movement sequences involved: for example threading wires into tubes; wrapping with fabric tape, in particular on branches of wire sections, fitting contacts to the wire, in particular for so-called twin-lead terminals (two wires on one contact); inserting tubes one into the other; or fixing looms with tapes, clips or cable binders.

These movement sequences are obviously difficult to automate. To date, it has been possible to use machines only to a limited extent. However, corresponding actions can also be learnt quickly with little occupational skill. Therefore, manual production is, as before, more cost-effective than automation. Therefore, cable harnesses are usually produced abroad, in particular in low-wage countries.

In different vehicles, for example in heavy goods vehicles, there is also a large variety of variants which is a result of various configurations and vehicle lengths, so that only very small batch sizes (up to 1) can be achieved. Nevertheless, different variants are produced on the same modeling boards. Humans have the advantage over machines specifically in this case, since humans can adapt to different variants in a short time without “reprogramming”.

However, prefabrication can be partially automated. This relates, inter alia, to: cutting individual wires (cutting machines); fitting contacts to one or both sides of a wire, partially equipping the connector housing with pre-contacted wires, welding a plurality of wire ends (welding machine); or twisting wires.

However, a manual production process has the disadvantages of a higher expected error rate and greater outlay on quality assurance.

Conventional, manually assembled cable harnesses are delivered to automobile manufacturers and inserted into vehicles during final assembly. The additional problem of how to fix cable harnesses in the motor vehicle arises here. Documents DE 295 10 148 and DE 103 49 046 disclose plastic fastening elements. However, these fastening elements have to be manually fitted to the cable harness. This requires exact manual positioning on the cable harness both axially and circumferentially.

U.S. Pat. Nos. 4,265,687, 4,368,762 and 4,371,010 describe initial approaches to partially automated solutions. However, these devices have the disadvantage that they are too heavy and too bulky. In the course of developments in the field of microelectronics, the requirement for more compact and reliable binding devices has therefore increased. U.S. Pat. No. 4,265,687 (mentioned above) describes an exemplary binding device. In the case of this tool, a movable guide element is provided which, in a first position, can accommodate a cable bundle in the wrapping region and, in a second position, surrounds the cable bundle, so that a wrapping tape can be guided around the cable bundle. The wrapping tape is ultrasonically welded to the cable bundle. A sonotrode with a pincer-like anvil is used for this purpose. The pincers of the anvil are each L-shaped and protrude into the cable bundle, around which the wrapping tape is wrapped, during the welding process. A similar problem is described in document DE 34 13 099 C2. The wires of the harness may be unintentionally welded together during the welding process. Furthermore, the L-shaped mating pieces leave behind an air gap after being withdrawn from the cable bundle after a welding process has taken place, so that the previously tightened wires may, under certain circumstances, become slack again.

BRIEF SUMMARY OF THE INVENTION

One object of the present invention is therefore to provide a system and method with which cables, cable looms and cable harnesses are bound in an automated manner and can be arranged in a desired circumferential position by a fastening element. A particular aim is to avoid unintentional connections between the wrapping tape and the article to be wrapped. Furthermore, air gaps between the articles to be wrapped are to be kept as small as possible. In this case, particular value is placed on process reliability and a low error rate. The system should be so cost-effective that it can be implemented in industrial countries. The fastening elements should be fixed in the correct location, in terms of the cable harness circumference, as early as during production of the cable harness.

It is disclosed an apparatus for automatically, circumferentially wrapping an axially extending article, in particular a cable or a cable loom, with a wrapping tape in a wrapping plane which is oriented substantially perpendicular to the axial direction of the article, wherein the tape is connectable to a fastening element, and the apparatus having a gripper device with at least one first jaw and a second jaw, the jaws are mounted such that they can move relative to one another in such a way that the jaws, in a closed position for wrapping the tape, encompass a wrapping region into which the article to be wrapped is placed while the jaws are in an open position, the jaws being formed such that the fastening element and the wrapping tape can be circumferentially guided around the article to be wrapped; a joining tool for joining at least parts of overlapping portions of the tape when the tape at least once has been completely circumferentially guided around the article to be wrapped with the tool being adapted to join the tape to the fastening element separately from the article to be wrapped; a first feed device for feeding the tape, which is preferably provided continuously, to the gripper device during the wrapping operation with an advancing movement and retracting same during tautening of the tape; a second feed device for feeding the fastening element to the gripper device; and a control device which is adapted to lock the fastening element in a predefined circumferential position relative to the article, and which is further adapted to cause the first feed device to advance the tape forward relative to the fastening element by a predefined tape length.

Many processes can be automated using such an apparatus. Wrapping of a cable harness with a wrapping tape according to the invention is automated. Fitting of a fastening element to the wrapping tape is automated. Positioning of the fastening element relative to the circumference of the article to be wrapped is automated. An apparatus of this type can be retrofitted to a modern multiple-axis industrial robot without any problem, so that the apparatus can be used even on a fully automated automobile production line.

Manual production of cable harnesses in low-wage countries is dispensed with. Corresponding work can again be carried out on site, and at a more cost-effective price. The efforts which have to be made in connection with quality assurance are considerably lower than in the case of manual assembly. Enormous improvements in quality are achieved.

The relative position of the fastening element on the circumference of the article to be wrapped can be predetermined by means of the predefined tape length. The greater the forward-feed tape length provided, the further removed the fastening element is from a seam where the overlapping wrapping tape is, for example, welded after the tape has been tautened.

Additionally the second feed device can comprise a driver unit which accommodates the fastening element, which can move along the jaws into the predefined circumferential position, and which can be locked in the circumferential position.

In this embodiment, the second feed device or its driver unit is responsible for placing the wrapping tape with the fastening element in the correct circumferential position, before the tape is retracted for tautening purposes. In this case, it would therefore be entirely sufficient for the wrapping tape to be fed to the gripper device, for example, by means of the force of gravity. It would also be sufficient if the feed device were to have only a retracting drive but not an advancing drive.

As an alternative, a locking device for the fastening element can be provided, wherein said locking device is displaceable along the jaws in the circumferential direction.

In this alternative embodiment, the first feed device is provided with an advancing drive in order to advance the tape until the article to be wrapped is finally wrapped. The fastening element which is provided above the second feed device, for example a tractor wheel, could be fixed to the tape, for example in advance, and then be guided along the jaws of the gripper device into the circumferential position together with the tape. The locking device for the fastening element is moved into this desired circumferential position in order to accommodate and to lock the fastening element there as soon as the tape is retracted again for tautening purposes.

If the circumferential position changes in successive working steps, the locking device could approach the desired circumferential position in an isolated manner in each case. The jaws preferably have corresponding guides, for example grooves, along which the locking device and the wrapping tape are guided.

According to a further embodiment, the tool is mounted such that it can pivot relative to the gripper device in the circumferential direction.

This measure has two advantages which are independent of each other. Firstly, the tool can be used as a separating device for the tape (which is provided in continuous form). As soon as the fastening element is connected to the tape and the tape is again connected to itself, the tool can be pivoted in the circumferential direction in order to be used as a type of blade, so that the rest of the tape can be separated. In this case, no protrusions are formed on the tape, which protrusions would, if the article to be wrapped were then inserted into a tube, prevent insertion into the tube. Secondly, overlapping regions of tape can be connected to one another without any problem, irrespective of the circumferential position of the overlapping regions relative to the article to be wrapped. It is, for example, possible for the predefined circumferential position of the fastening element to be varied from clip to clip, depending on where the clip is to be fixed in relation to the length of the cable harness (for example once at 90° and a second time at 270°). The joining tool has to be able to adapt to these conditions.

Therefore, it may also be advantageous when the tool is mounted such that it can pivot in a plane which is oriented perpendicular to the cross-sectional plane of the article.

However, the ability to pivot just mentioned is advantageous particularly when using a wrapping tape which has a core region and tab regions which protrude laterally from said core region, the tab regions having to be connected to one another and the core region resting (solely) on the article to be wrapped. This ensures that the connection direction of the tabs runs at an angle to the connection direction between the tape and the article. The risk of the article being unintentionally welded to the wrapping tape is therefore reduced.

According to a further preferred embodiment, the tool has a welding head which can move in the radial direction, in particular a sonotrode, and a welding counter element.

Sonotrodes are tools which are made to vibrate in a resonant manner by the introduction of high-frequency mechanical vibrations (ultrasound). These vibrations create the connection between an ultrasound generator and a workpiece and match the ultrasonic vibration to any processing task (impedance matching). Sonotrodes are used in ultrasonic welding in order to create a permanent connection between the components in the joining or contact zones on account of various processes. Sonotrodes are usually produced from aluminum, titanium or steel. Their geometry is dependent on the frequency provided by the generators used and on the processing task. In the case of ultrasonic welding, the connection is generated by force and motion. The temperature increase occurring in a joining zone serves only to assist the welding process. Joining forces and ultrasonic vibration have the same directions of action. Introduced longitudinal waves cause a pulsating compressive load in the material and in the joining zone, which leads to plasticization of the workpiece. A permanent, mechanically stable connection is produced.

Process-related and material-related welding influencing variables are accordingly set. Process-related parameters include: welding amplitudes, welding force and the introduced welding time or welding speed which determines the level of the respectively introduced welding energy per unit of area. The welding frequencies are firmly prescribed for the respective welding systems. Customary operator frequencies are between 20 and 40 kHz. The vibration amplitude can vary in the range of from 5 to 40 μm. When producing point-to-point connections, the required welding time is less than 3 seconds. Welding seams can be generated at a speed of up to 25 m per minute.

The process variables always have to be adapted taking into account the material-related influencing variables. Therefore, the physical and technological properties of the joining part particularly affect the ultrasonic welding ability. A high degree of hardness and a high G-module assist, for example, the ability to transfer ultrasonic energy. In contrast, a relatively high ductility of the material requires the optimum welding surface formation. The surface roughness is also very important in ultrasonic welding. Average roughness values of greater than 20 μm lead to point-to-point energy transfers at only a few roughness peaks. As a result, so-called "hot spots" with steep temperature gradients in relation to the surrounding material are produced at these points.

The counter element of the joining tool preferably has two pincer-like counterparts which do not touch in a closed position.

Since the counterparts do not touch, they do not completely surround the tape. It is therefore possible for the tape to be grasped only from behind and for the joining processes to take place preferably only at the side, i.e. outside the core region of the tape. Air gaps being created by extracting counterparts which touch in a closed position, as is customary in the prior art, is avoided. The desired, dense packing of cables in a cable harness can be maintained. It cannot be subsequently changed.

In particular, the counterparts are formed such that only the tabs of the tape are welded to one another. The core is not welded to the article to be wrapped. This prevents, for example, the insulation of cables of the cable loom melting through and short circuits being produced.

Further, there is an advantage if a separating device is additionally provided which separates the remaining tape after the fastening element is fixed to the object by means of the tape.

This is particularly advantageous when using a continuous wrapping tape. According to a further preferred embodiment, a sensor is also provided for determining a force with which the tape is retracted. This ensures that the tape is always stretched around the article to be wrapped with the desired tensile force. The cables of the cable harness are not pinched but are not loose either. This also ensures that the fastening element remains in its predefined circumferential position. Depending on the tensile stress set, the fastening element can be subsequently displaced in the circumferential direction and/or in the radial direction of the article to be wrapped, in order to compensate for, for example, the assembly tolerances. When mounting the counterparts of the fastening elements on the vehicle body, a certain amount of play is always produced, so that it is advantageous if the predefined positions can be subsequently changed slightly.

Further, it is proposed a method for automatically, circumferentially wrapping an axially extending article, in particular a cable or a cable loom, with a wrapping tape, specifically in a wrapping plane which is oriented substantially perpendicular to the axial direction, wherein the tape is connectable to a fastening element, comprising the following steps: feeding the tape; feeding the fastening element; advancing the tape by a predefined tape length relative to the fastening element, and then joining the tape and the fastening element to one another; moving the article into a wrapping region; moving the fastening element into a predefined circumferential position in relation to the article, and locking the fastening element in the circumferential position; tautening the tape around the article by retracting the tape when the tape is fixed to the fastening element by means of the joining step and when the fastening element is locked in the circumferential position; and joining overlapping portions of the tape.

The method just explained ensures that the fastening element is fixed to the cable harness in a predefined circumferential position in an automated manner. The use of manual labor is no longer required. The high requirements on quality are met. Manufacture and production of the cable harnesses can again be performed in the industrial nations.

The above objects are achieved by a wrapping tape for automatically, circumferentially wrapping an axially extending article, in particular a cable or a cable loom, with the tape being suitable for being wrapped around the article and then tautened and joined to itself in an overlapping manner, and with the tape comprising: a core which has a contact area which is intended to rest on the article; and at least one tab which protrudes laterally from the core, each tab forming such an angle with the contact area that a joining tool can engage behind the tab when the tape is wrapped around the article, without the tool engaging behind the contact area, whereas the tabs of an overlapping tape portion are joined to one another.

This prevents the tape being welded to the article itself. Air gaps within the cable in the cable harness are avoided, as explained above.

According to a preferred embodiment, the tab is integrally formed with the core.

In this case, the tape can be extruded. Production is simple and effective in terms of process engineering.

According to a further particular embodiment, a constricted portion is provided on a face, which is opposite the contact area, of the core between the tab and the core, with said constricted portion running substantially in the longitudinal direction of the tape.

The constricted portion increases the flexibility of the tabs in relation to the core. This may be advantageous when the tabs are relatively small in relation to the counterparts of the sonotrodes or when the counterparts are not sharp enough to reliably engage behind the tab. In this case, it is possible to bend the flexible tabs away from the article to be wrapped, in particular during the welding process. Secondly, the constricted portions permit the tabs to rest on the article to be wrapped, after a welding process has taken place.

In particular, the tape is formed from a weldable, elastic plastic, in particular with a predefined tensile strength in the longitudinal direction of the tape.

The core preferably has a substantially rectangular cross section.

One of the long sides serves as an abutment face on the article or on the fastening element. The tape usually lies flat on the article.

It is also advantageous when a cross section of the tab tapers toward the outside in relation to the core.

The smaller the material layers of the tabs which are to be joined to one another, the shorter the welding time and the more reliable is a permanent and firm connection between the overlapping tape sections. Furthermore, regions with a lower material thickness are more flexible than regions with greater material thicknesses. This makes it easier for the counterparts of the sonotrodes to engage behind the wrapping tape when it is moved into its closed position.

According to a further preferred embodiment, a surface of the tab is selected to be large enough to ensure permanent joining of overlapping tabs.

It is clear that the tabs must not be too small, since otherwise they would not be able to withstand the high loads which are created by the wrapping tape being tautened.

In particular, the contact area of the core is formed without edges.

This measure ensures that the wrapping tape lies as flat as possible on the article to be wrapped. Constriction of the article to be wrapped by the tape is prevented.

As an alternative, the contact area can be coated with an adhesive.

In this case, the predefined circumferential position is guaranteed to be permanently maintained. Slipping or displacement of the wrapping tape in the circumferential direction or in the axial direction of the article can then be precluded.

Further, it is described a fastening element for fastening an longitudinally extending article, in particular a cable or a cable loom, which is to be fixed to a component, in particular to a vehicle body component, with a wrapping tape, having a body which has: a first cheek element, a second cheek element, and at least two connection struts which connect the cheek elements to one another in the longitudinal direction of the body and which define an opening for receiving the tape, it being possible to insert the tape into the opening substantially transversely, in particular perpendicularly, to the longitudinal direction, in order to independently wrap the article with the tape.

The fastening element is formed such that it can be wrapped around a cable loom in an automated manner together with a wrapping tape, in order to create a cable harness. No manual actions are required in order to move the fastening element to a predetermined circumferential position relative to the article to be wrapped.

The fastening element may be clamped, for example, on a pin in a vehicle body, since it preferably has a first clamping element which forms a clamping unit together with a second clamping element, with the second clamping element being connected to the component.

The fastening element preferably has a funnel-shaped opening.

A funnel-shaped opening makes it easier to insert the tape into the fastening element, in particular when a machine is used.

It is also advantageous when the first clamping member is a hole.

In this case, the second clamping element constitutes a type of pin or a bolt onto which the fastening element can be plugged.

It is also preferred when a contact face of the body is matched to a contour of the article with which contact is to be made.

This ensures that the packing of the cable looms which is as dense as possible is maintained during the automated wrapping process.

In particular, the contact face is defined by parts of the cheek elements. In this case, each of the cheek elements can have a contact area which has an elastic region which protrudes in the direction of the article.

The cheek elements contribute to pressing the components of the article to be wrapped closely against one another. Packing which is as dense as possible is maintained. Tolerances can therefore be compensated for.

In addition, the contact face can be defined by one of the connection struts. This makes it easier to adjust the fastening element on the article to be wrapped.

In particular, the connection strut is in the form of a bar, so that orientation is preferably performed in the longitudinal direction of the article to be wrapped.

According to a further advantageous embodiment, a third connection strut is provided.

A third connection strut increases the rigidity of the connection of the fastening element.

It has also proven advantageous when a further face of the body, which face is directed toward the component in the installed state, has one or more spacer lugs which protrude from the face.

In the installed state of the fastening element, the fastening element can then be released in a simpler manner, for example, from a vehicle body. On account of the spacer lugs, the fastening element is not seated flat on the vehicle body and can therefore be acted on from below, for example by a screwdriver, in order to release the fastening element.

It is clear that the abovementioned features and those still to be explained below can be used not only in the respectively prespecified combination but also in other combinations or on their own, without departing from the scope of the present invention.

BRIEF DESCRIPTION OF THE SEVERAL VIEWS OF THE DRAWINGS

Exemplary embodiments of the invention will be explained in greater detail in the description which follows and are illustrated in the drawing, in which.

DETAILED DESCRIPTION OF THE PREFERRED EMBODIMENT(S) OF THE INVENTION

In the description of the invention which follows, identical features are provided with similar reference symbols. Where identical reference symbols are used, the features are unchanged. Deviations and modifications will be explicitly explained.

Figure 1:
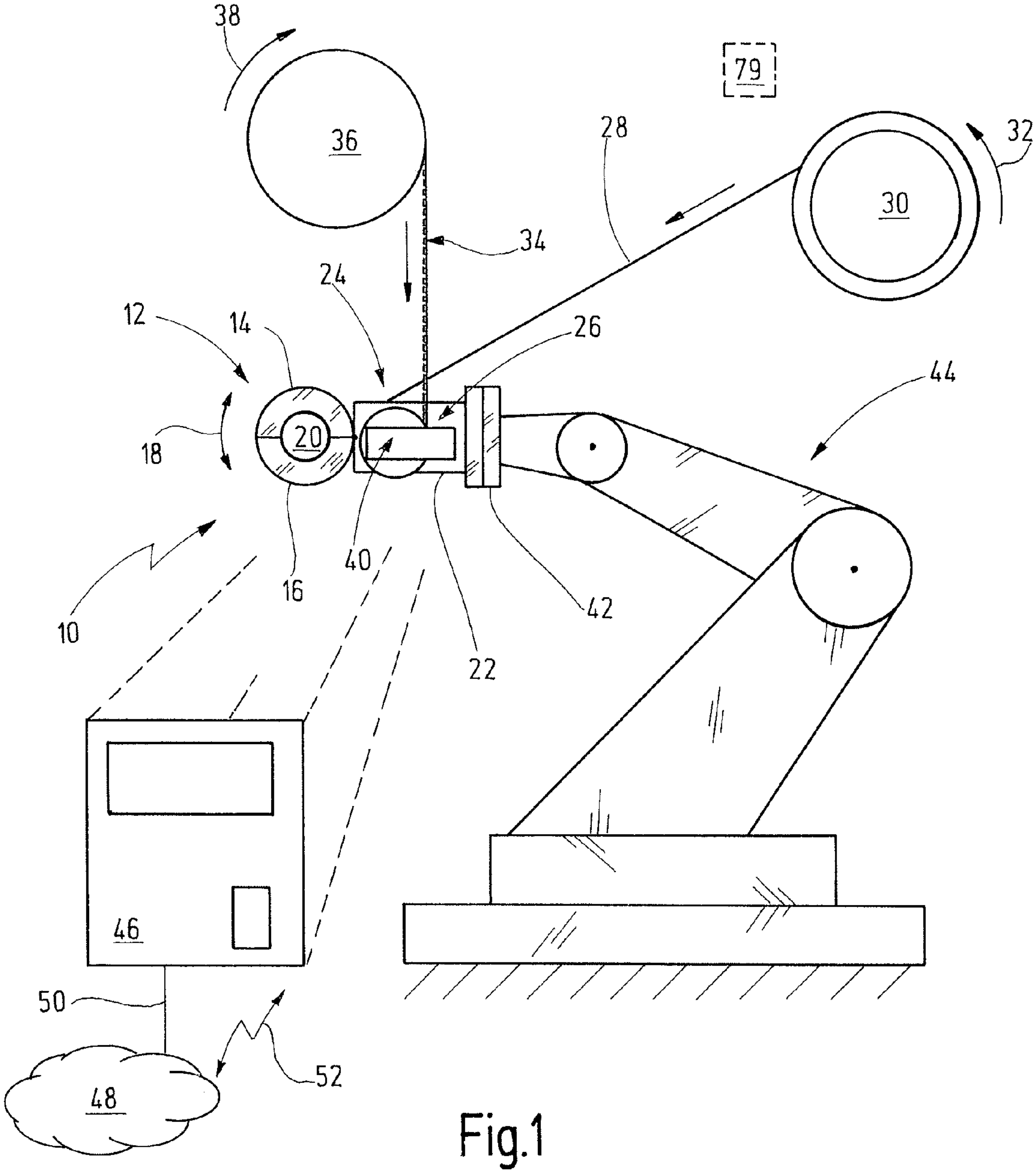
FIG. 1 shows a schematic side view of an apparatus for automatically wrapping articles, in particular cable harnesses, according to the present invention.

FIG. 1 shows an apparatus 10 according to the present invention which is fitted to a multiple-axis robot.

The apparatus 10 has a gripper device 12 which, in turn, comprises a first jaw or a pincer 14 and a second jaw respectively a pincer 16. The first jaw 14 and the second jaw 16 are illustrated in a closed position in FIG. 1. The jaws 14, 16 are mounted such that they can move relative to one another. In the specific example of FIG. 1, the jaws 14, 16 are mounted such that they can pivot in relation to one another, with the first jaw 14 being pivotable and the second jaw 16 being fixed. It goes without saying that both jaws 14, 16 could be movable and that the jaws 14, 16 are, as an alternative, also mounted such that they can be displaced in relation to one another, in order to be opened and closed. A corresponding opening movement and closing movement is indicated in FIG. 1 by a double-headed arrow 18.

The jaws 14, 16 surround a wrapping region 20 in which, as will be explained later, articles, for example cables or cable looms, can be combined and wrapped in an automated manner in order to produce, for example, cable harnesses. The (geometric) center of the wrapping region 20 is indicated by a dot 21 in FIG. 2.

The gripper device 12 is, as shown in FIG. 1, integrated in the housing 22 of the apparatus 10.

The apparatus 10 also has a first feed device 24 and a second feed device 26. The first feed device 24 is used here to unwind a continuous wrapping tape or tape 28 from a first reel 30 in the direction of an arrow 32 in order to deliver said tape to the apparatus 10. The second feed device 26 is used here to unreel fastening elements 34, which are provided in continuous form, from a second reel 36 in the direction of an arrow 38 in order to feed said fastening elements to the apparatus 10. It goes without saying that both the tape 28 and the fastening elements 34, which, in turn, are later to be clamped to corresponding mating pieces, for example on the body of a car, can also be fed individually, that is to say not continuously. The fastening elements 34 can also be glued removably to a belt tape. The specific embodiment of the tape 28 will be described with reference to FIGS. 11 to 13. The specific embodiment of the fastening element 34 will be described with reference to FIGS. 15 and 16, it being understood that the embodiments shown in FIGS. 11 to 16 are merely exemplary in nature and can be subjected to a large number of modifications.

The apparatus 10 of FIG. 1 also has a joining tool 40 with which the tape 28 can, if necessary, be fixed to the fastening element 34, for example to a clip 34. The joining tool 40 (not explicitly illustrated in FIG. 1) also serves to join overlapping portions of the tape 28, as is shown by way of example in FIG. 14.

The joining tool 40 may be a thermal welding unit, an ultrasonic welding unit or the like. Hereinafter joining processes are implemented by means of ultrasonic welding. It is clear that other methods, and therefore other joining tools 40, can be used in order to fix or connect the tape 28 to the fastening element 34 and/or to itself.

In FIG. 1, the apparatus 10 according to the present invention is, by way of example, fastened to a mounting plate 42 of a multiple-axis industrial robot 44. To this end, the housing 22 has a correspondingly formed mounting flange which is matched to the dimensions of the mounting plate 42. It is clear that the apparatus 10 according to the present invention can also be implemented in the form of a pistol-like hand tool, with the reels 30, 36 being correspondingly dimensioned. A hand tool can also be used to combine, tightly wrap and, with a fastening element 34 in a predetermined circumferential position in relation to the article to be wrapped, as will be explained in greater detail in the text which follows, produce cable looms in an automated manner. The industrial robot 44 is then replaced by the hand of an operator.

The apparatus 10 also has a control device 46 which serves to coordinate the various method steps for automatically wrapping longitudinally extending articles. The control device 46 can be connected to a superordinate control computer 48 via a line 50 (for example a bus line). However, as an alternative, the connection can also be made via a wireless connection 52. When the industrial robot 44 is in use, the control system 46 can also be connected to a programmable logic control (PLC) system (not illustrated in FIG. 1) of the robot 44 in order to coordinate the movement sequences of the robot 44 with the method steps of the apparatus 10.

Figure 2:
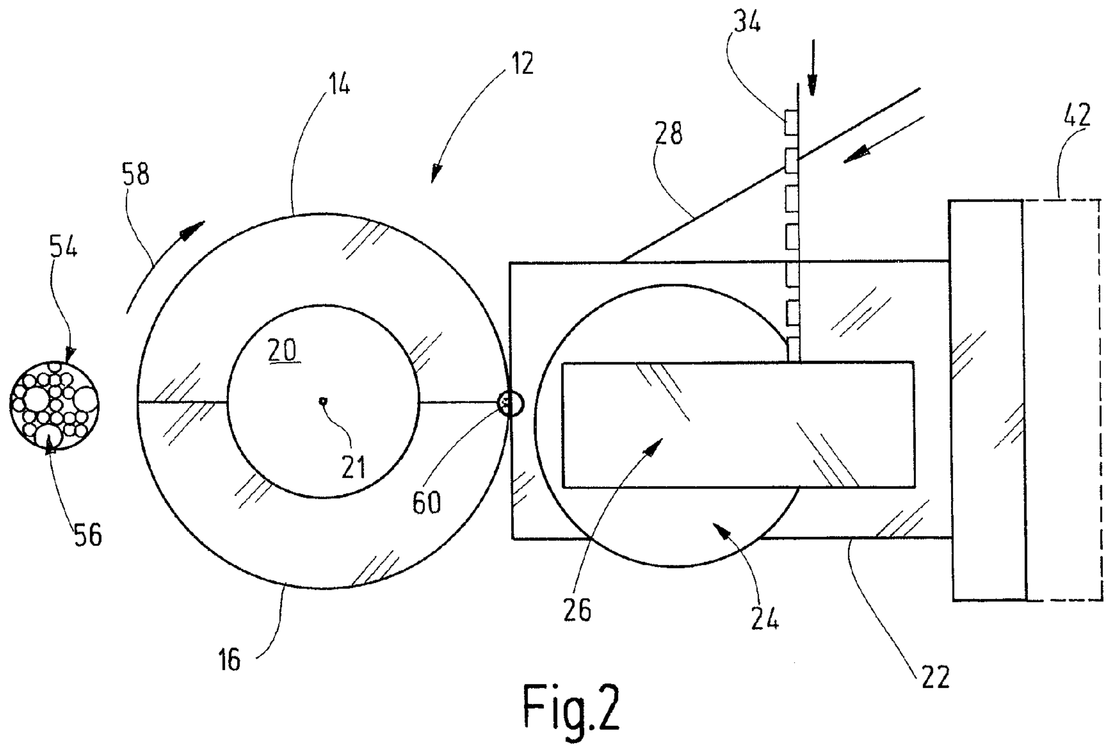
FIG. 2 shows an enlarged view of a gripper device, a first feed device and a second feed device of FIG. 1, with the gripper device being in a closed position.

FIG. 2 shows an isolated view of a part of the apparatus 10 of FIG. 1. The robot 44 of FIG. 1 is not shown in FIG. 2. The same applies to the reels 30 and 36 for the tape 28 and, respectively, the fastening elements 34.

FIG. 2 shows a cable loom 54, by way of example as an article to be wrapped. The cable loom 54 comprises, for example, a plurality of individual wires 56 which should be combined by means of the apparatus 10 to form a cable harness.

As in FIG. 1, the gripper device 12 of FIG. 2 is shown in a closed position. The jaws 14, 16 are mounted relative to one another in a pivot bearing 60 such that they can pivot, with only the first jaw 14 being mounted in a pivotable manner here by way of example. An opening direction of the first jaw 14 is indicated by an arrow 58.

Figure 3:
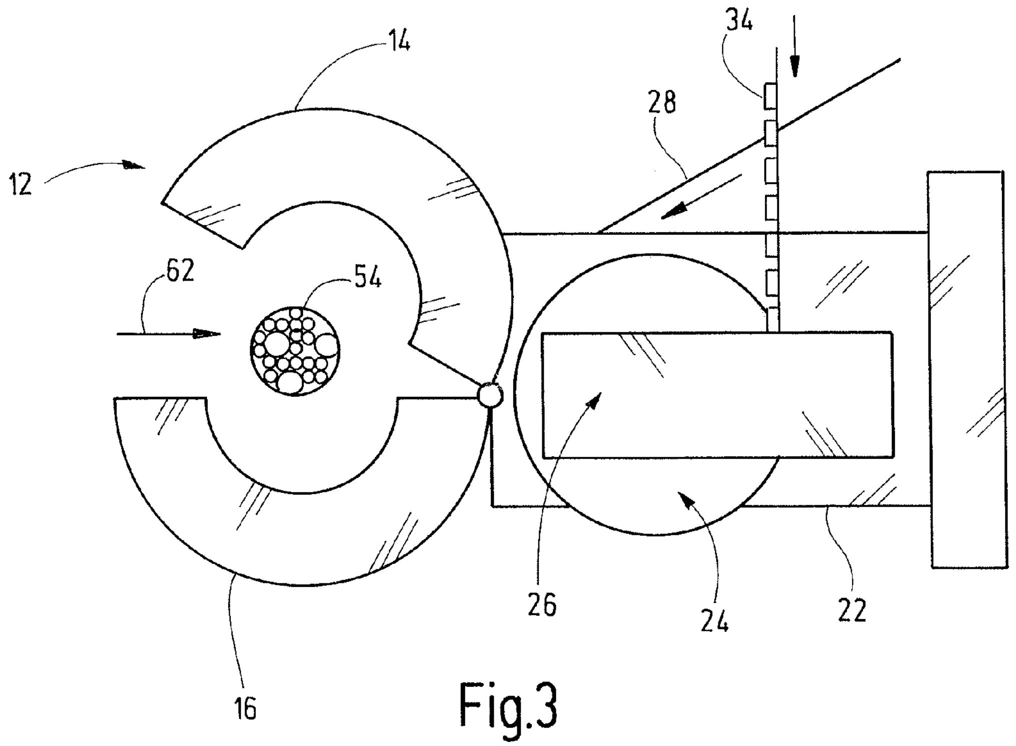
FIG. 3 shows the gripper device of FIG. 2 in an open position, with a cable loom inserted into the gripper device.

FIG. 3 shows the apparatus 10 of FIG. 2 at a later time. The gripper device 12 is shown in an open position. The cable loom 54 has been moved into the wrapping region 20 of the gripper device 12 in the direction of an arrow 62. The cable 54 covers the center point 21 of the wrapping region 20 (cf. FIG. 2). It is clear that the cable loom 54 could also be inserted into the gripper device 12 at any desired position within the wrapping region 20.

Figure 4:
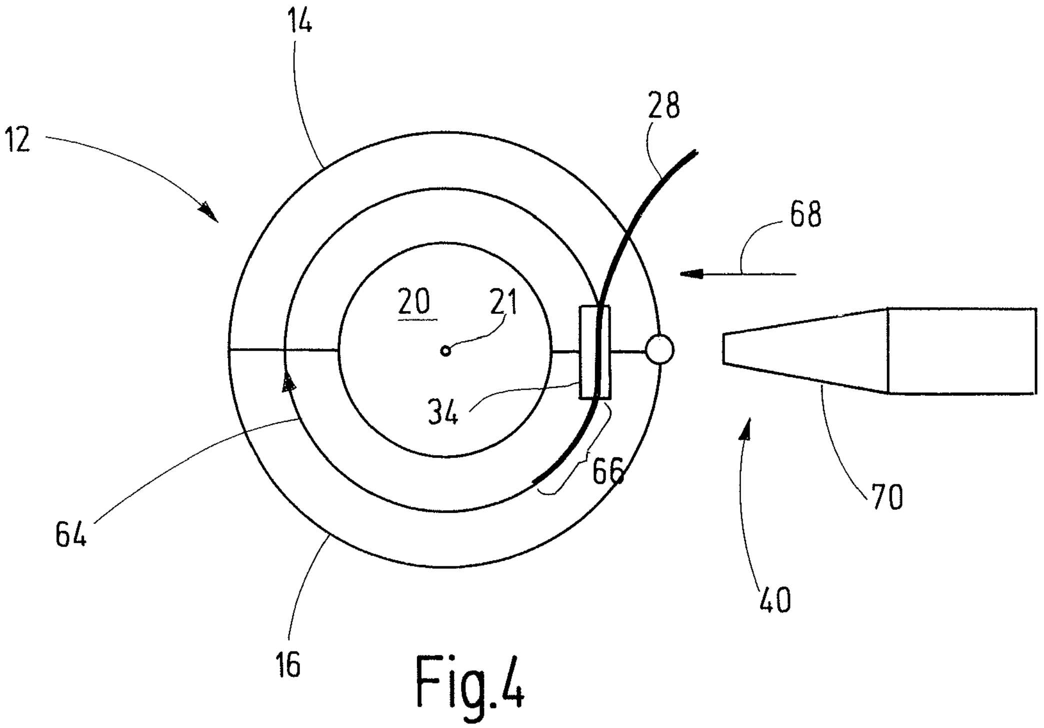
FIG. 4 shows an isolated illustration of the gripper device of FIGS. 1 to 3, with a joining tool additionally being illustrated.

FIG. 4 shows parts of the inventive apparatus 10 of FIGS. 1 to 3. In particular, the gripper device 12 and parts of the joining tool 40 are respectively illustrated in the following FIGS. 4 to 9. In FIG. 4, reference symbol 64 indicates a guide path which runs within or along the jaws 14, 16. The guide path 64 surrounds the wrapping region 20 completely, i.e. by 360°. The guide path 64 may be, for example, in the form of a groove which runs along the inner circumference of the jaws 14, 16, which is adapted to the contour of the fastening element 34. The jaws 14 and 16 may be hollow on the inside, in order to provide sufficient space for allowing the tape 26 and the fastening element 34 to be moved within or along the jaws 14, 16 around the wrapping region 20 to any desired location on the circumference.

FIG. 4 shows the gripper device 12 in the closed position by way of example. A fastening element 34 is provided above the second feed device 26 (not illustrated in FIG. 4). The fastening element 34 can have openings for receiving the tape 28, as is still to be described in greater detail with reference to FIGS. 15 and 16. The first feed device 24 then guides the tape 28 through this opening in the fastening element 34 and pushes a predeterminable forward-feed length 66 through the (already separated) fastening element 34. The forward-feed length 66 determines the position in which the fastening element 34 is arranged in relation to the circumference of the article 54 (not shown in FIGS. 4 and 5) which is to be wrapped. A circumferential position which is predetermined in such a way will be explained in even greater detail with reference to FIGS. 6 and 7.

Figure 5:
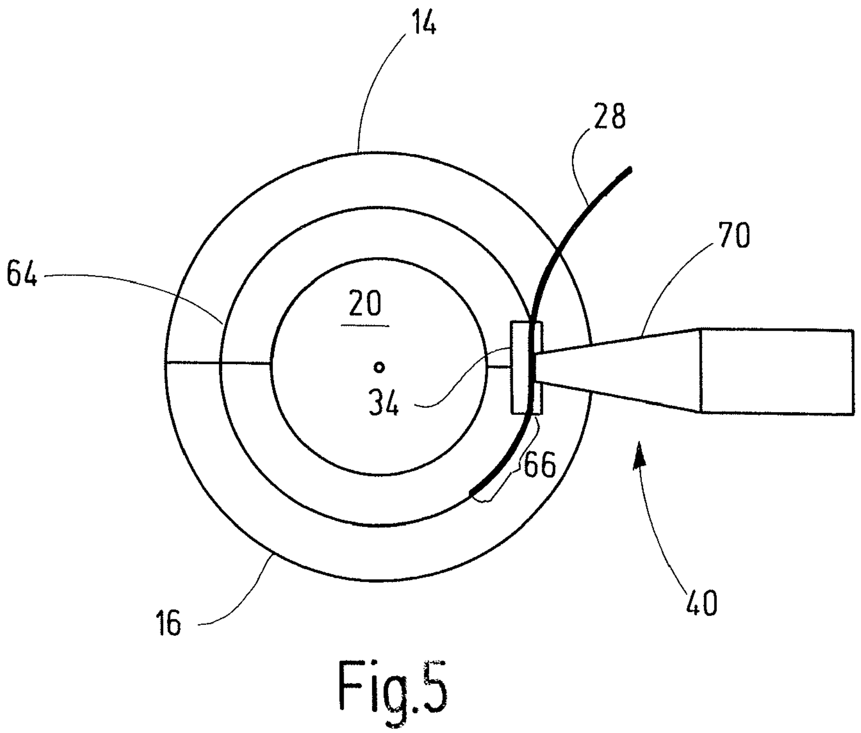
FIG. 5 shows the elements of FIG. 4, with a fastening element being fixed to the wrapping tape by a joining tool.

After the tape 28 is guided through the fastening element 34 with the predetermined forward-feed length 66, a welding head 70, in particular a tip of an ultrasonic welding head, can be moved toward the fastening element 34 and the tape 28 in the direction of an arrow 68, i.e. in a radial direction in the reference system of the article to be wrapped, in order to fix said fastening element and tape to one another. This is shown in FIG. 5. The welding head 70 touches the tape 28 and attaches the tape 28 to the fastening element 34. To this end, the fastening element 34 has a corresponding opening through which the welding head 70 can pass. In the present example, the use of a mating piece, for example an anvil, is not required since the fastening element 34 is held in the guide path 64 and therefore is itself the mating piece required for the (ultrasonic) welding process. It is clear that the tape 28 and the fastening device 34 could also be joined to one another in alternative ways. The elements 28 and 34 could be, for example, welded, riveted, pressed, or the like, to one another. The fastening element 34 can be hold by anvil elements, which are not depicted here, during the welding. The anvil elements then are movably mounted perpendicular relative to the drawing plane. The welding process can also take place if the jaws 14, 16 are still open. The anvil elements can be used later for seeding the tape 28.

Figure 6:
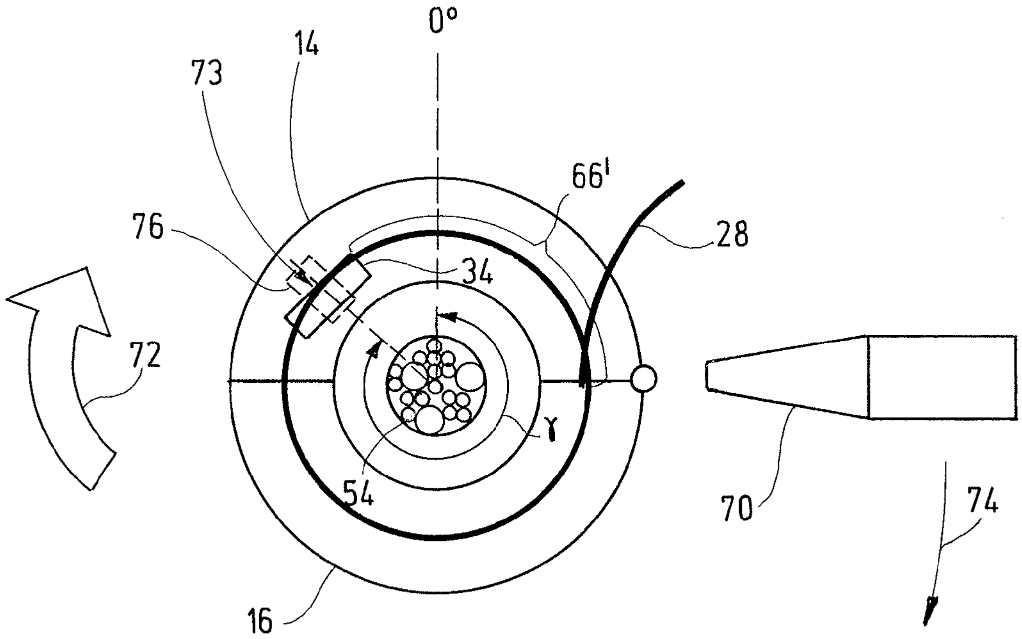
FIG. 6 shows the elements of FIG. 5 at a later time when the tape is wrapped around a cable loom, with the fastening element being locked in a predefined circumferential position.

After the tape 28 is successfully fixed to the fastening element 34, the welding head 70 can return to its home position. This situation is shown in FIG. 6. Furthermore, the cable loom 54 in FIG. 6 has already been moved to the center 21 of the wrapping region 20. To this end, the first jaw 14 in the position of FIG. 5 can be opened in order to move the cable loom 54, as shown in FIG. 3, into the wrapping region 20 in the direction of the arrow 62. However, as an alternative, the cable loom 54 can also be moved into the wrapping region 20 first, and the tape 28 is fixed to the fastening element 34 only subsequently. The cable loom 54 can also be introduced into the wrapping region 20, if the jaws 14, 16 are in their closed position, by moving the cable loom perpendicular relative to the drawing plane.

In FIG. 6, the tape 28 has once already been wrapped completely, i.e. through at least 360°, around the cable loom 54 along the guide path 64. The forward-feed length 66' of FIG. 6 differs from the forward-feed length 66 of FIGS. 4 and 5. The forward-feed length 66' is greater than the forward-feed length 66. The tape 28 is correspondingly advanced in the direction of an arrow 72. This can be done either by the first feed device 24, which is then provided with a corresponding advancing drive, or, as an alternative, the fastening element 34 can also be moved or pulled along the guide path 64 into a desired circumferential position 73 by suitable means. These means may be part of the second feed device 26. As an alternative, these means can also be provided separately from the second feed device 26. In FIG. 6, a dashed line shows an optional driver 76 which is suitable for receiving a fastening element 34. The driver 76 can be locked in the desired circumferential position 71. When the tape 28 is attached to the fastening element 34, the driver 76 can also pull the tape 28 from its home position corresponding to the position of the fastening element 34 in FIGS. 4 and 5.

It is clear that, in a embodiment in which the first feed device 24 advances the tape 28, the tape 28 can also first be attached to the fastening element 34 at the location of the circumferential position 73. To this end, and for other reasons, the joining tool 40 or the welding head 70 can be mounted such that they can pivot in the circumferential direction relative to the gripper device 12 or to the driver 76, as indicated in FIG. 6 by an arrow 74. The welding head 70 can move into an angular position, which corresponds to the circumferential positions 73, through an angle γ which, in FIG. 6, is between 270° and 360°, that is to say approximately 300°. The circumferential position 73 is determined, amongst other things, by the forward-feed length.

Alternatively, a counter carrier can be provided within the region of the jaw hinge instead of the units 76, 76'. The counter carrier jams the overlapping portions of the band 28 to each other such that the fastening element 34 floats freely on the cable loom 54 in the wrapping region. Subsequently, the band 28 is retreated, wherein the counter carrier still fixes the overlapping portions.

Figure 7:
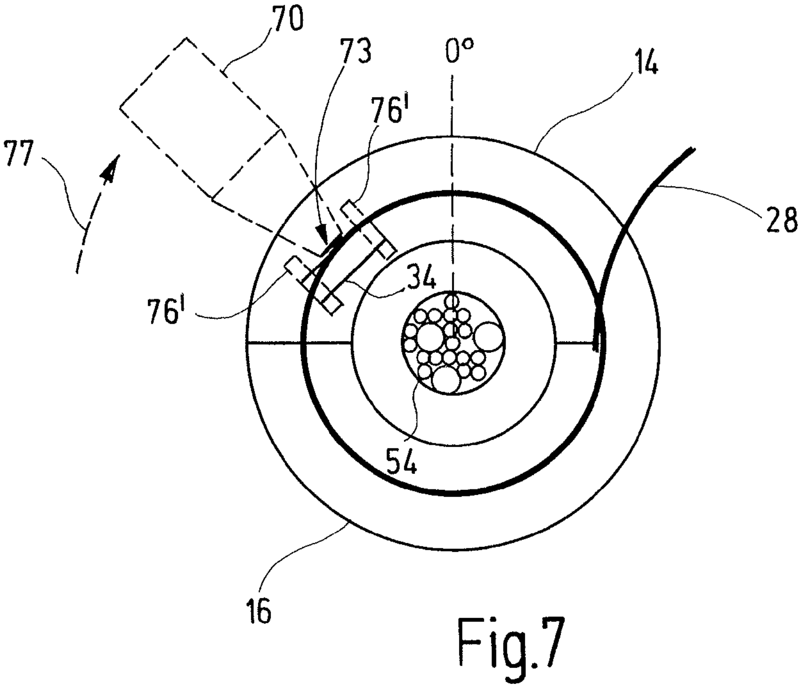
FIG. 7 shows an alternative to FIG. 6, with the fastening element first being fixed on the tape in the circumferential position.

FIG. 7 shows the variant in which the tape 28 is first attached to the fastening element 34 when the fastening element 34 is moved to the predetermined circumferential position 73. It is clear that the driver 76' is formed in such a way that the welding head 70 can attach the tape 28 to the fastening element 34.

It is clear that the units of FIGS. 6 and 7 which are designated with reference symbols 76 and 76' do not necessarily have to "drive" the tape and, respectively, the fastening element 34. In this case, the units 76 and 76' can be moved along the guide path 64, but serve solely for the purpose of locking the fastening element 34 in the circumferential position 73. Fixing of the fastening element 34 in the circumferential position 73 is therefore important because the tape 28 is retracted in the next method step in order to place a sheath around the cable loom 54 and to tauten it around the cable loom 54, as far as possible without large spaces between the individual wires 56 of the cable harness to be produced. This is shown in FIG. 8.

Figure 8:
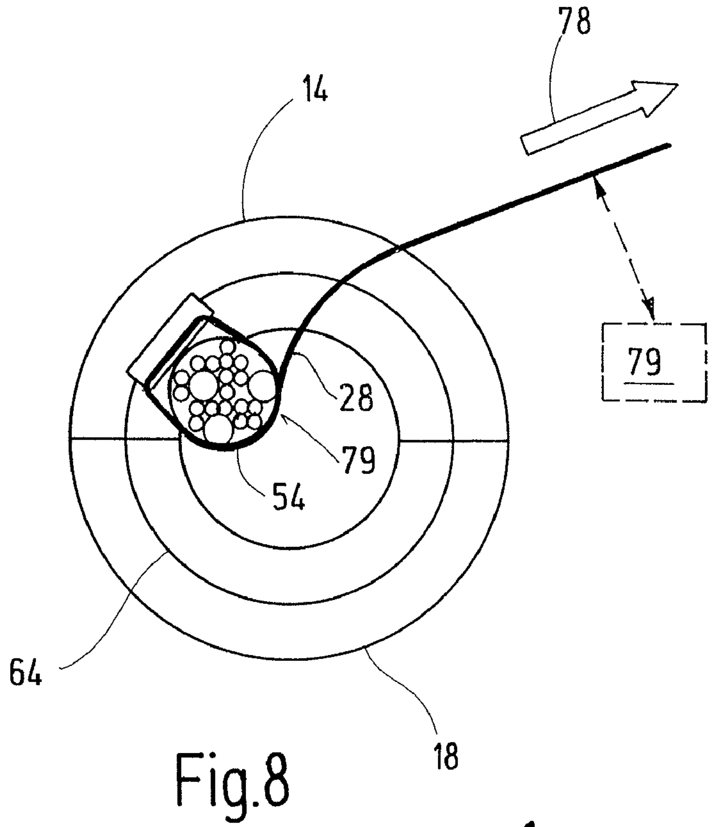
FIG. 8 shows the cable loom in a wrapped state, with the tape being tautened and the tensile force being determined by means of a sensor.

In FIG. 8, the retraction is indicated by an arrow 78. The retraction can be implemented by a drive of the first feed device 24. This drive can be switched off as a function of torque. The torque can be determined and signaled to the control device 46 by means of a force sensor 79. If a predefined tensile force is reached, the retraction is stopped.

It can be seen in FIG. 8 that parts of the tape 28 now overlap. These overlapping portions of the tape 28 can, in turn, be joined to one another in order to ensure permanent fixing of the tape 28 around the article 24.

It can also be seen that the fastening element 34 has remained in the predetermined circumferential position 73 during the wrapping process. This is particularly important in the case of particularly long cable harnesses since the fastening elements 34 constantly have to be arranged at different circumferential positions in relation to the cable harness, in order, in the case of installation in a car for example, to later be able to interact with, i.e. to be fastened to, the corresponding counterparts on the body of the car.

As soon as the tape 28 is sufficiently tautened around the cable loom 54, the overlapping portions of the tape 28 can, for example, be attached to one another. A detailed explanation of this process is provided in connection with FIGS. 11 to 14. To this end, the welding head 70 is either pivoted in the circumferential direction in such a way that it can be moved by a subsequent radial movement toward the overlapping portions of the tape 28, or alternatively the fastening element 34 with the units 76 and 76' illustrated in FIGS. 6 and 7 can be moved, for example, to an angular position of 270°, so that the welding head 70 has to be radially adjusted only in the direction of the arrow 68 (cf. FIG. 4) in order to attach the overlapping portions of the tape 28 to one another.

Figure 9:
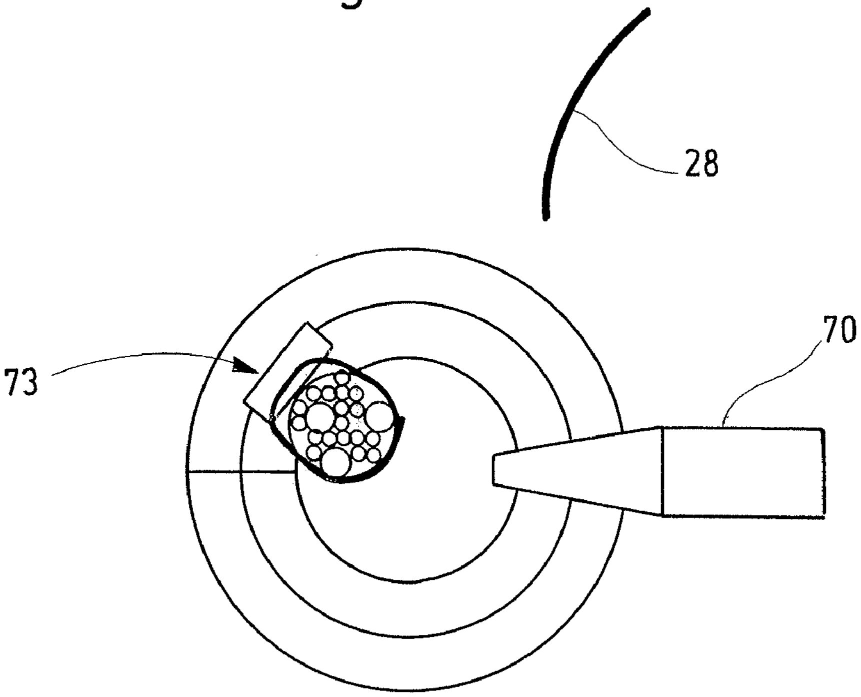
FIG. 9 shows the cable loom in a wrapped and fixed state, with the rest of the tape being separated by means of the joining tool.

The welding head 70 can then be adjusted once again in the circumferential direction in order to separate a part of the tape 28, which does not overlap, from the wrapped and attached cable loom 54. As an alternative, separation can be performed by means of a cutting device (not illustrated here). The separated tape 28 is shown in FIG. 9.

Figure 10:
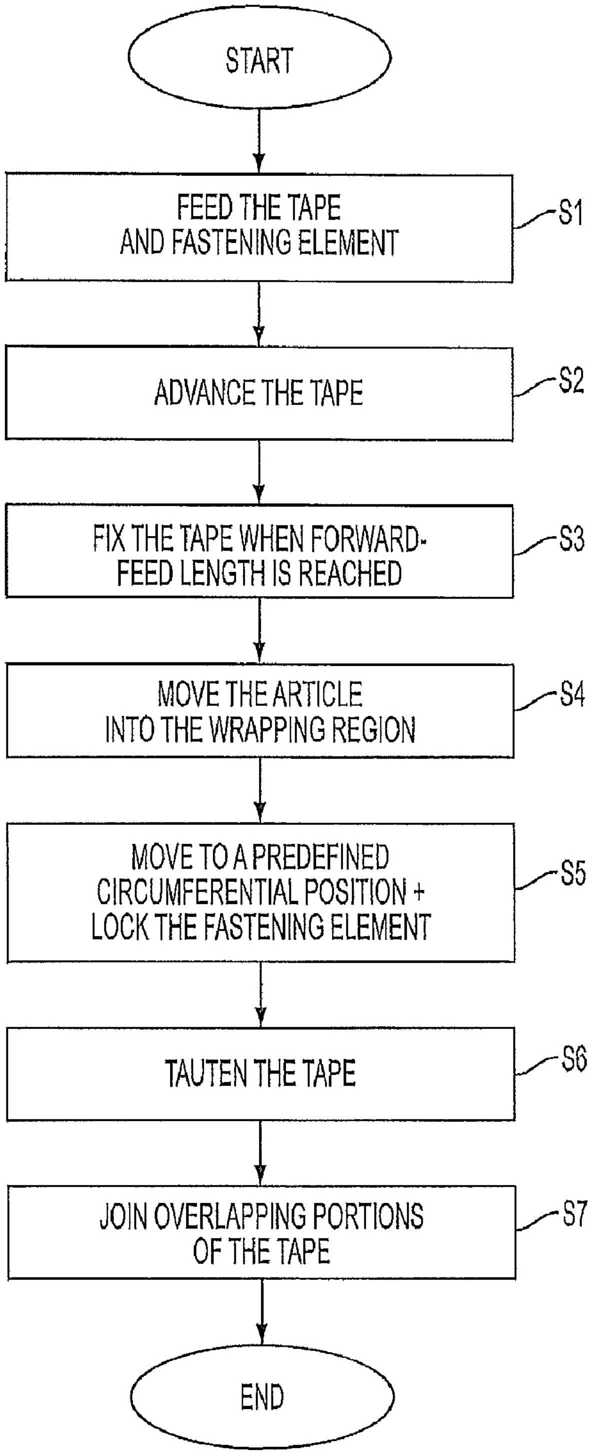
FIG. 10 shows a flow chart of the method according to the present invention.

FIG. 10 describes a method for automatically wrapping longitudinally extending articles with a tape and a fastening element.

In a first step S1, the tape 28 and the fastening element 34 are fed to the apparatus 10. In a further step S2, the tape 28 is advanced relative to the fastening element 34 by a predefined tape length 66 or 66', with the tape 28 being fixed to the fastening element 34 when the forward-feed length 66 or 66' is reached (step S3). In a step S4, the article 54 is moved to the wrapping region 20. In a step S5, the fastening element 34 is moved into the predefined circumferential position 73, relative to the article 54, and locked there. In a step S6, the tape 28 is tautened around the article 54 by the tape 28 being retracted. Finally, in a step S7, the overlapping portions of the tape 28 are joined to one another. Details of the method according to the invention have already been described above.

Figure 11:
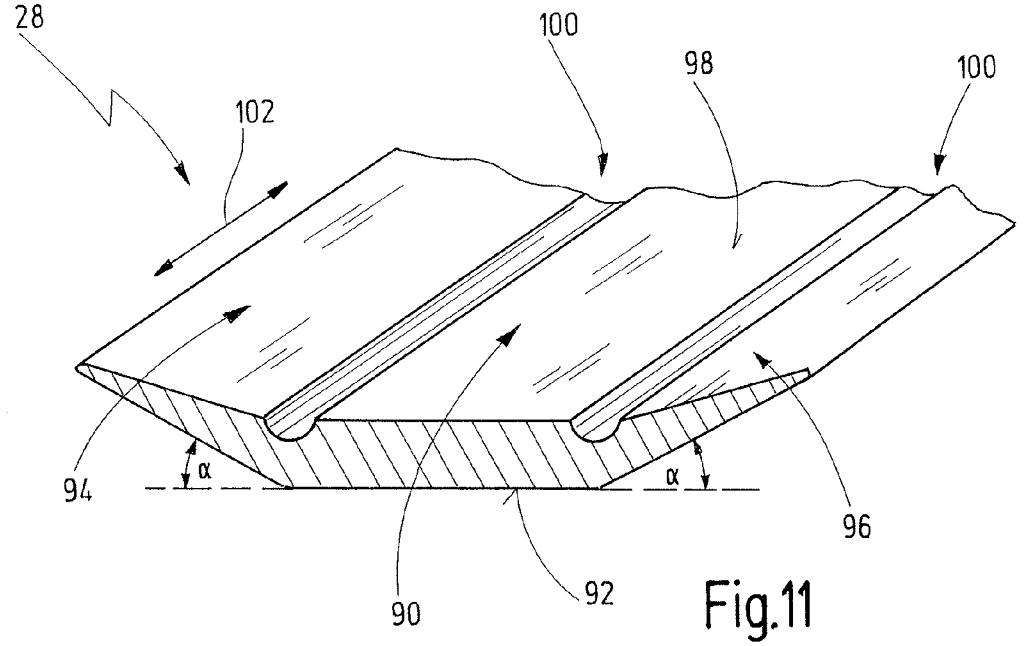
FIG. 11 shows a partially sectioned, perspective view of a tape according to the present invention.

FIG. 11 shows a partially sectioned perspective view of a tape 28 according to the present invention, as is used in connection with the preceding Figures.

The tape 28 has a core region 90 and at least one laterally protruding tab region and corresponding tabs 94, 96, respectively. The core 90 has a contact area 92 which is intended to rest on the article 54 to be wrapped, as is shown by way of example in FIG. 14. The contact area 92 is situated opposite a face 98. The face 98 is oriented substantially parallel to the face 92 and serves to support overlapping portions of the tape 28 when the tape 28 is wrapped completely around the article 54. The contact area 92 is preferably free of edges, in order to not constrict the article 54.

The tape 28 also has constricted portions 100 which extend in each case between the core 90 and one of the tabs 94 and 96 in the longitudinal direction 102 of the tape 28. In FIG. 11, the constricted portions are shown with a semicircular cross section. It is clear that the shape of the constricted portions 100 can be selected as desired. The constricted portions 100 serve to increase the flexibility of the tabs 94 and 96, in particular when overlapping tab portions are to be connected to one another, as will be explained in even greater detail with reference to FIG. 14. The tabs 94 and 96 form an angle α with the contact area 92, in order to enable counterparts of the joining tool 40 to engage behind said tabs more easily. The tape 28 is produced by means of extrusion, preferably made of a weldable plastic which has, in particular, the properties mentioned at the outset.

Figure 12:
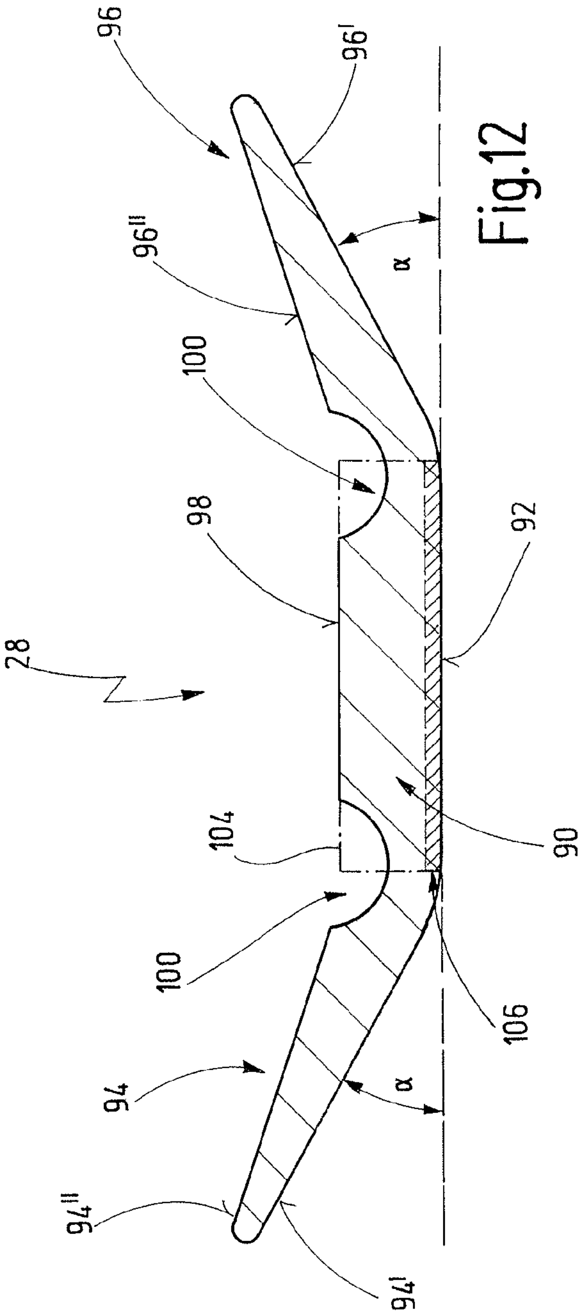
FIG. 12 shows a cross section through the tape of FIG. 11.

In FIG. 12, the tape 28 of FIG. 11 is illustrated in cross section, wherein the substantially rectangular core 90 (compare dash-dotted line 104) can have a different material composition in the form of an inner coating 106 in the region of the contact area 92. During extrusion of the plastic, a slightly changed material composition can be used in the region 106 of the contact area 102, so that the static friction between the contact area 92 and an article 54 to be wrapped is reduced. This measure makes it easier to subsequently displace the tautened tape 28 both in the circumferential direction and in the axial direction of the article 54, in order to be able to compensate for tolerances during the installation process.

The tabs 94 and 96 preferably taper toward the outside. This measure makes it easier to weld overlapping tabs since the material thickness reduces toward the outside. The surfaces 94', 94" and 96', 96" of the tabs 94, 96 are selected to be large enough to allow overlapping tabs to reliably join to one another.

Figure 13:
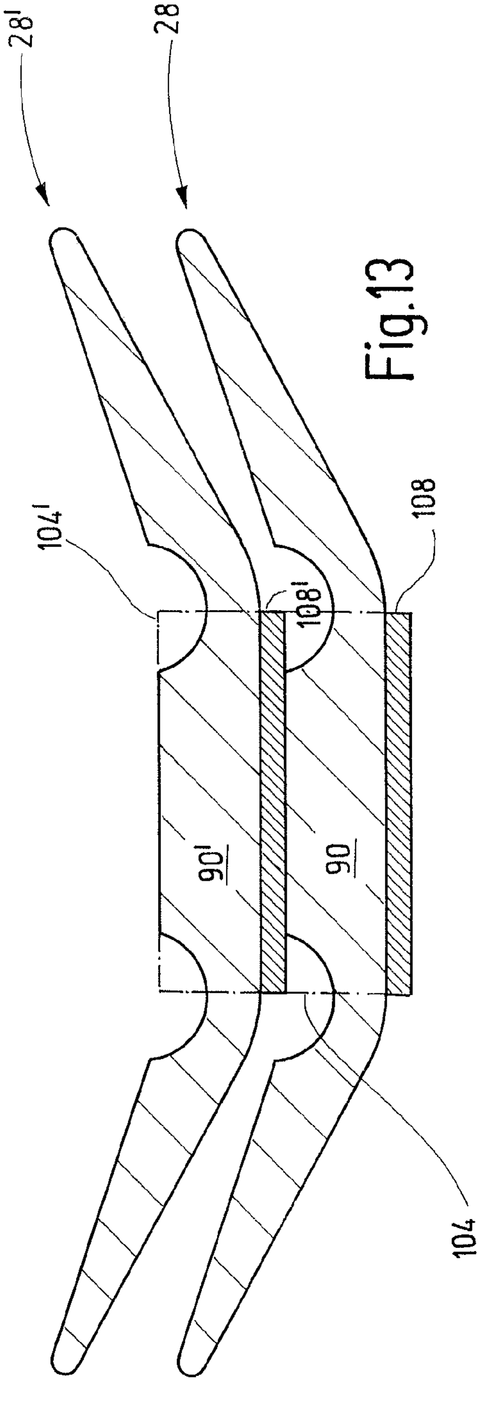
FIG. 13 shows an alternative embodiment of the tape according to the present invention, with portions of the tape overlapping.

FIG. 13 is a further embodiment of a tape 28 according to the present invention in an overlapping state. The tape 28 differs from the tapes 28 of FIGS. 11 and 12 in that it has an additional coating 108 or 108' which is applied to the contact area 92. The additional, external coating 108, 108' may be, for example, an adhesive layer, in order to prevent unintentional movement of the relative position of the fastening element 34 in relation to the article 54. In addition, the external layer 108 assists the connection between the overlapping portions of one and the same tape 28. In FIG. 13, the tapes are therefore only provided with reference symbols 28 and 28' in order to show that first the tape 28 is wrapped around an article 54 (not illustrated here), and then is to be overlapped by the same tape, which is denoted 28' here.

Figure 14:
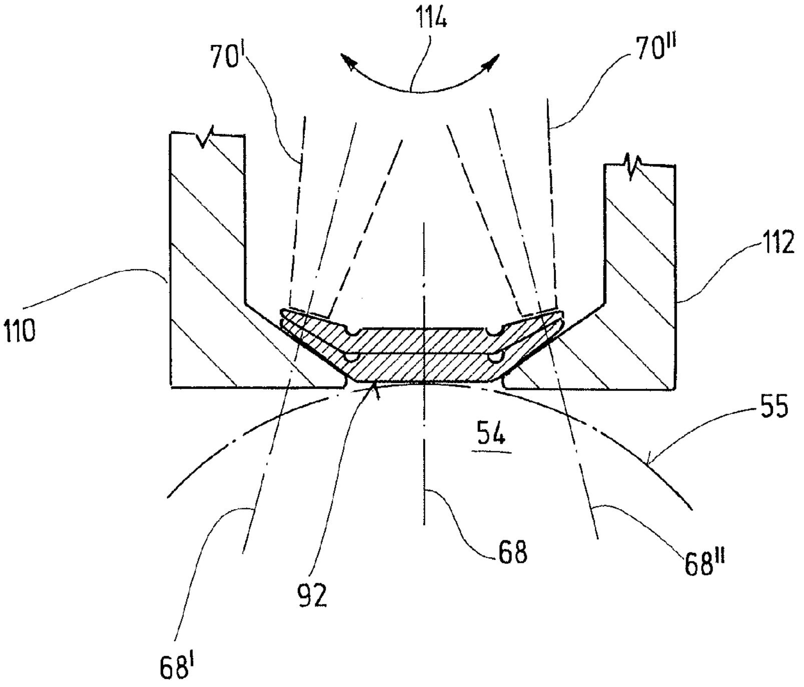
FIG. 14 shows an overlapping tape shortly before it is fixed by means of the joining tool, with counterparts of the joining tool engaging behind tabs of the tape.

In FIG. 14, the tape 28 is likewise shown in an overlapping state. In addition, counterparts 110, 112, for example anvils, as are required to carry out an ultrasonic welding process, are shown.

It can be seen that the contact area 92 rests on a contour or surface 55 of the article 54 which is illustrated by the dash-dotted line in FIG. 14. The auxiliary line 68 indicates the radial movement direction of the welding head 70 (compare FIG. 4 when the core 90 is connected to the fastening element 34, but which is not shown in FIG. 14). FIG. 14 serves to illustrate the welding process of the overlapping tab portions of the tape 28.

The anvils 110 and 112 engage behind the tabs of the tape 28, in order to serve as counter bearings for the welding head 70. In FIG. 14, two different positions 70' and 70" of the welding head 70 are shown. In order to be able to reach these positions, the welding head 70 is mounted such that it can pivot along an arrow 114 in the cross-sectional plane of FIG. 14. It can clearly be seen that the welding direction 68' or 68", when the tabs are welded to one another, is a direction other than the direction 68 which indicates the point-to-point contact of the tape 28 on the fastening element 34. This ensures that the cable loom 54 is not welded to the contact area 92. Welding of the contact area 92 to the cable loom 54 is disadvantageous since, following welding, the tape 28 is no longer positioned relative to the cable loom 54, for example to compensate for tolerances, and secondly wires 56 (not illustrated) or their insulations may melt through in FIG. 14 in such a way that short circuits occur. Short circuits are therefore precluded.

In this connection, reference is made to the fact that FIG. 14 shows the anvils 110, 112 in their closed position. The anvils 110, 112 do not touch in the closed position. The distance between the counterparts 110 and 112 is preferably selected in such a way that it corresponds substantially to the length of the contact area 92 in the circumferential direction. In this case, the counterparts 110, 112 do not extend between the overlapping tape 28 and the cable loom 54, so that no gap is produced between the tape 28 and the cable loom 54 after the anvils 110, 112 are withdrawn or opened. The desired prestress of the tape 28 around the cable loom 54 is therefore maintained.

Figure 15:
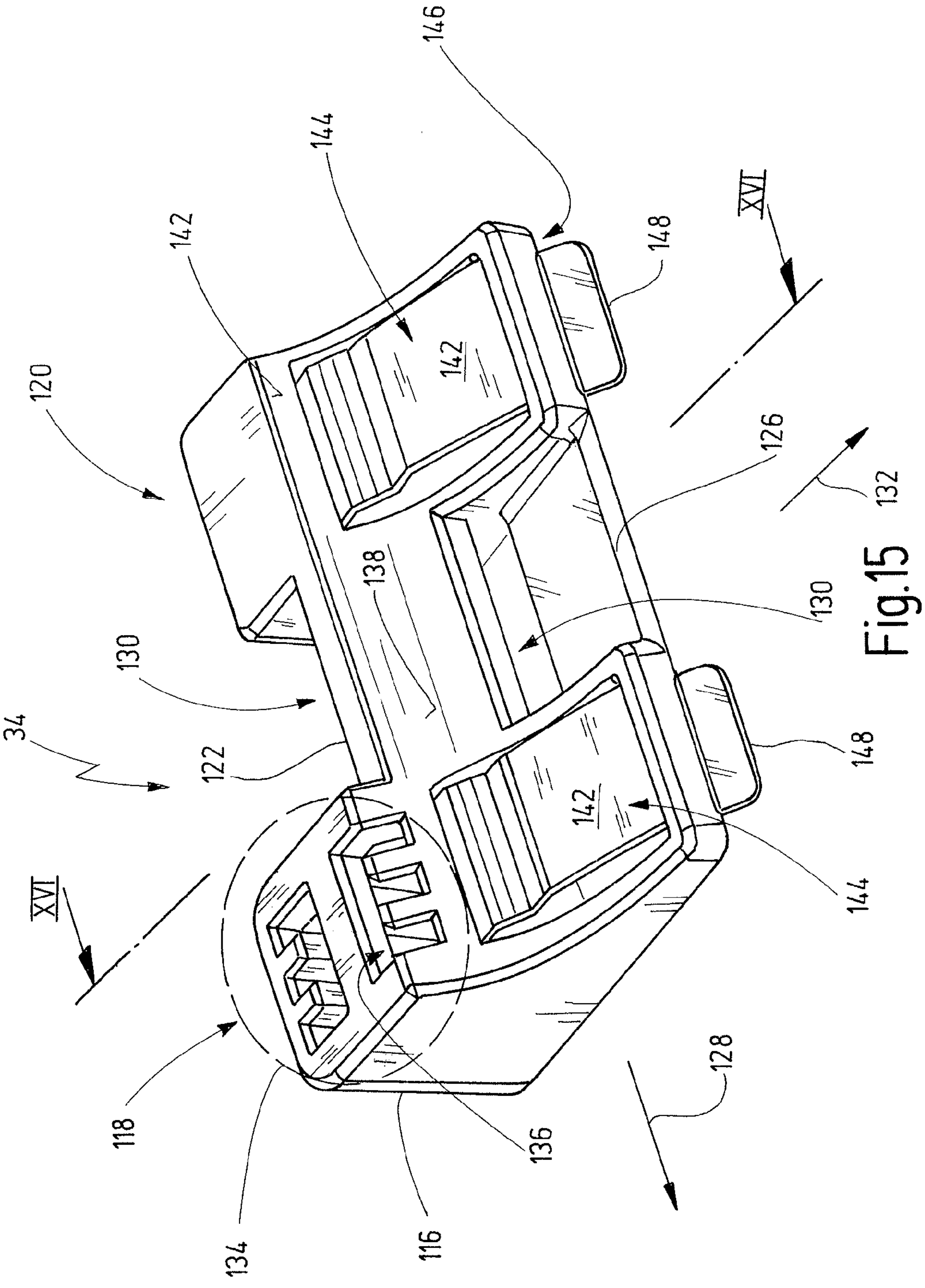
FIG. 15 shows a schematic isometric view of a fastening element according to the present invention.

FIG. 15 shows a perspective view of an exemplary embodiment of a fastening element 34 according to the present invention.

The fastening element 34 has a body 116. The body has a first, left-hand cheek element 118 and a second, right-hand cheek element 120. The cheek elements 118, 120 are connected to one another by means of connection struts 112 to 126. The connection struts 122 to 126 extend in the longitudinal direction 128 of the fastening element 34. In the state in which said fastening element is attached to the article 54, the longitudinal direction 128 corresponds to the axial direction of the article 54.

The connection struts 122 to 126 define an opening 130 which is suitable for receiving the tape 28. The opening 130 is preferably of funnel-like form, as will be explained in even greater detail with reference to FIG. 16.

The opening 130 extends transverse to the longitudinal direction 128, as is indicated by an arrow 132.

The first cheek element 118 and/or the second cheek element 120 can have a clamping element 134 which is in the form of a toothed hole 136 in FIG. 15. This toothed hole 136 can interact with a second clamping element (not illustrated here), for example with a pin, which can be fastened to a vehicle body part, for example of a car. The fastening element 34 can then be used to fasten a cable harness to the body of the car by the toothed hole 136 being plugged onto the pin. The fastening element 34 then rests on the cable loom by way of a contact face 138.

Figure 16:
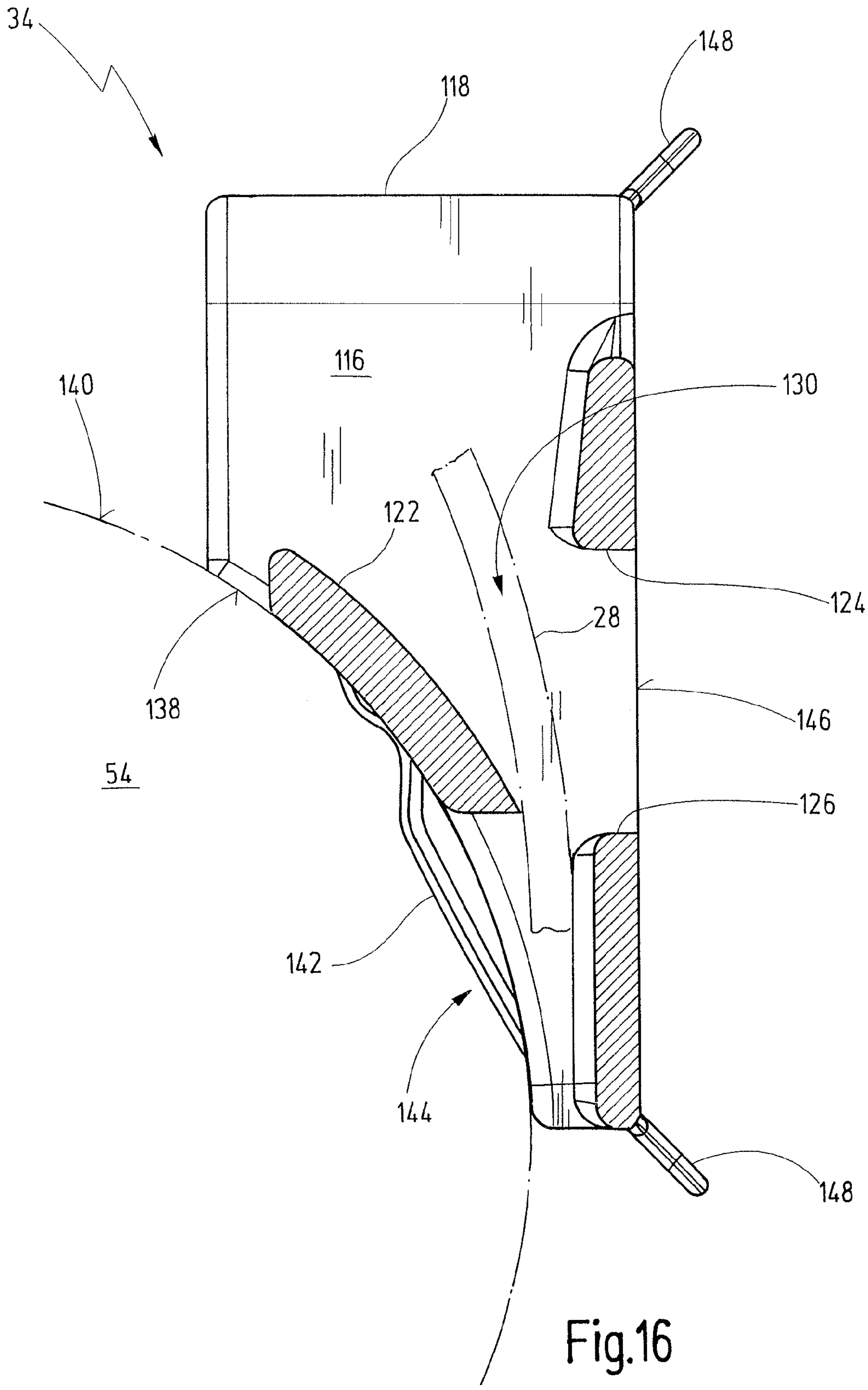
FIG. 16 shows a partially sectioned view of the fastening element of FIG. 15.

The fastening element 34 of FIG. 15 is shown in a partially sectional view in FIG. 16. The line of section is indicated in FIG. 15 by a connection line XVI-XVI. The Figure therefore shows the left-hand cheek element 118 from the right-hand side.

The three connection struts 122, 124 and 126 can be clearly seen in FIG. 16. It is clear that only two connection struts are required to define the opening 130, in particular a funnel-shaped opening. In order to make the course of the tape 28 in the fastening element 34 clearer, part of the tape 28 is indicated by a dash-dotted line 28. The same applies to the cable loom 54 which is likewise indicated by a dash-dotted line. In the example of FIG. 16, the cable loom 54 has a virtually circular contour. The contact face 138 of the fastening element 34 is preferably adapted to the contour 140 of the cable loom 54 or of an arbitrarily formed article 54 which is to be wrapped.

In order to ensure that the fastening element 34 continues to rest sufficiently tight on the article 54 after a long time, the cheek elements 118, 120 in each case have a flexible contact tongue 142. The tongue 142 protrudes in the region of the article 54 and is preferably flexible. If the tension of the tape 28 reduces after a long time, the prestressed tongues 142 can be relieved of tension and therefore ensure permanent tautening of the system comprising the tape 28 and the fastening element 34 around the article 54.

That face 146 of the fastening element 34 which is averted from the article 54 usually serves to rest on vehicle body parts. Therefore, one or more spacer lugs 148 can be provided, so that an air gap remains between the fastening element 34 and a vehicle body part.

It should also be noted that the arrangement of the transverse struts 122 to 126 is selected in such a way that the joining tool 40 can connect the tape 28, in particular, to the transverse strut 122. The joining tool 40 can penetrate the space, for example through a further opening which is defined between the struts 124 and 126, in order to fix the tape 28 to that face on the strut 122 which is averted from the article 54.

It is clear that the tape 28 according to the invention might also be wrapped around the cable loom 54 without the fastening element 34.

Although exemplary embodiments of the present invention have been shown and described, it will be appreciated by those skilled in the art that changes may be made to these embodiments without departing from the principles and spirit of the invention, the scope of which is defined in the appended claims and their equivalents.

The invention claimed is:

1. A wrapping tape for automatically, circumferentially wrapping an axially extending article, in particular a cable or a cable loom, said tape being suitable for being wrapped around the article and then tautened and joined to itself in an overlapping manner by a joining tool, the wrapping tape comprising:

a core which has a contact area which is designed to rest on the article;

at least one tab which protrudes laterally from the core, wherein each tab forms an angle ($\alpha$) with the contact area so that the joining tool can engage behind the tab when the tape is wrapped tightly around the article, without the joining tool engaging behind the contact area, while the tabs of an overlapping tape portion are joined to one another; and a groove is located on a face of the core, which is opposite the contact area, and between the tab and the core, and the groove runs in the longitudinal direction of the tape and the groove has a depth that extends below the adjacent face of the core and an adjacent upper surface of the tab.

2. A wrapping tape according to claim 1, wherein the tab is integrally formed with the core.

3. A wrapping tape according to claim 1, wherein the tape is formed from a weldable, elastic plastic, with a predefined tensile strength in the longitudinal direction of the tape.

4. A wrapping tape according to claim 1, wherein the core has a substantially rectangular cross section.

5. A wrapping tape according to claim 1, wherein a cross section of the tab tapers towards the outside in relation to the core.

6. A wrapping tape according to claim 1, wherein a surface of the tab is selected to be large enough to ensure permanent joining of overlapping tabs.

7. A wrapping tape according to claim 1, wherein the contact area of the core is formed without edges.

8. A wrapping tape according to claim 1, wherein a material of the tape in a region of the contact area comprises a soft component for reducing static friction between the contact area and a surface of the article to be wrapped.

9. A wrapping tape according to claim 1, wherein the contact area is coated with an adhesive.

10. A wrapping tape for circumferentially wrapping a cable, said tape being suitable for being wrapped around the cable and then tightened and joined to itself in an overlapping manner by a joining tool, the wrapping tape comprising:

a core extending in a longitudinal direction and defining a substantially rectangular cross section, the core including a first face and a second face opposite to the first face, and the core further defining a first side between the first face and the second face and a second side opposite to the first side;

a first tab extending from the first side of the core in a first direction and tapering toward a first tip, the first tab including a first upper surface and a first lower surface, the first lower surface defining a first acute angle with a plane of the second face of the core;

a second tab extending from the second side of the core in a second direction and tapering toward a second tip, the second tab including a second upper surface and a second lower surface, and the second lower surface defines a second acute angle with the plane of the second face of the core; and a first groove located between the first upper surface of the first tab and the first face of the core, and the first groove runs in the longitudinal direction of the tape and the first groove defines a depth that extends below the adjacent first face of the core and the adjacent first upper surface of the first tab.

11. A wrapping according to claim 10, the wrapping tape further comprising a second groove located between the second upper surface of the second tab and the first face of the core, and the second groove runs in the longitudinal direction of the tape.

12. A wrapping according to claim 10, wherein the first tip and the second tip extend beyond a plane of the first face of the core.

13. A wrapping according to claim 10, wherein the first tab and the second tab are formed integrally with the core.

14. A wrapping tape for circumferentially wrapping a cable, said tape being suitable for being wrapped around the cable and then tightened and joined to itself in an overlapping manner by a joining tool, the wrapping tape comprising:

a core extending in a longitudinal direction and defining a substantially rectangular cross section, the core including a first face and a second face opposite to the first face, and the core further defining a first side between the first face and the second face and a second side opposite to the first side;

a first tab extending from the first side of the core in a first direction and tapering toward a first tip, the first tab including a first upper surface and a first lower surface, the first lower surface defining a first acute angle with a plane of the second face of the core;

a second tab extending from the second side of the core in a second direction and tapering toward a second tip, the second tab including a second upper surface and a second lower surface, and the second lower surface defines a second acute angle with the plane of the second face of the core;

a first groove located between the first upper surface of the first tab and the first face of the core, and the first groove runs in the longitudinal direction of the tape; and wherein the first tip and the second tip extend beyond a plane of the first face of the core.

15. A wrapping according to claim 14, the wrapping tape further comprising a second groove located between the second upper surface of the second tab and the first face of the core, and the second groove runs in the longitudinal direction of the tape.

16. A wrapping according to claim 14, wherein the first tab and the second tab are formed integrally with the core.

* * * * *